SATURATION CONTROL APPARATUS FOR COLOR TELEVISION

Original Filed Sept. 28, 1954 2 Sheets-Sheet 1

INVENTOR.
STEPHEN W. MOULTON
BY
[signature]
ATTORNEY

May 26, 1964 S. W. MOULTON 3,134,851

SATURATION CONTROL APPARATUS FOR COLOR TELEVISION

Original Filed Sept. 28, 1954 2 Sheets-Sheet 2

INVENTOR.
STEPHEN W. MOULTON

BY

Dean V. Hagstrom

ATTORNEY

United States Patent Office 3,134,851
Patented May 26, 1964

3,134,851
SATURATION CONTROL APPARATUS FOR COLOR TELEVISION

Stephen W. Moulton, Wyncote, Pa., assignor, by mesne assignments, to Philco Corporation, Philadelphia, Pa., a corporation of Delaware Continuation of application Ser. No. 458,844, Sept. 28, 1954. This application Apr. 22, 1960, Ser. No. 24,173
15 Claims. (Cl. 178—5.4)

The present invention relates to improvements in color television systems, the instant case being a continuation of my copending application Serial No. 458,844, filed September 28, 1954. Particularly it relates to such improvements for increasing the fidelity of reproduction of colored images.

Although not limited thereto, the invention is particularly useful in its application to so-called simultaneous color television systems, and it will therefore be described with particular reference thereto.

In simultaneous color television systems there is transmitted a composite signal which includes a unidirectional, time-varying signal component and an alternating signal component, which together provide information concerning the luminance and chrominance of the televised scene. In one form of this signal, now adopted as standard by the Federal Communications Commission, the sum of the two aforementioned signal components, during successive time intervals, represents information concerning the instantaneous intensities of differenct primary color components of concurrently scanned elements of the televised scene. More particularly, during three successive time intervals within each cycle of the alternating signal component, the sum of the two components is representative respectively of the red, green and blue intelligence of a particular element of the televised scene. These intervals are of extremely short duration and therefore, during much of the time, the sum signal is not representative of color intelligence contained in the televised scene.

Typical apparatus employed in reproducing a colored image from a signal of this sort employs a special form of cathode ray tube having a screen structure constituted of a plurality of closely spaced minute phosphor elements, different ones of which are fluorescent in different primary colors in response to impingement by the electron beam. The intensity of the beam is modulated in response to the composite signal and its deflection is so coordinated with this modulation that the beam is caused to impinge on the phosphor elements emissive of light of a particular color when the electron beam is modulated in response to a portion of the composite signal representative of that color.

However, since it is not feasible to make the dimensions of the phosphor elements commensurate with the durations of the intervals during which the composite signal is truly representative of color intelligence contained in the televised scene, each element will be excited, during at least a portion of the period of beam impingement thereon, in response to portions of the composite signal which are not truly representative of color intelligence. The visual result of this in the desaturation or "washing out" of the reproduced colors relative to the corresponding colors of the televised scene. With screen elements of practical dimensions, this desaturation is so pronounced as to be deemed very objectionable by numerous observers.

In my copending application Serial No. 846,532, filed October 9, 1959, as a continuation of my abandoned application Serial No. 290,775, filed May 29, 1952, and abandoned November 12, 1959, and assigned to the assignee of the present invention, there is described one approach to a solution of this problem. In particular it is pointed out in this copending application that desaturation may be reduced, and the colors of the televised scene reproduced with greater fidelity if the amplitude of the received unidirectional luminance component is reduced by an amount proportional to the amplitude of the received alternating chrominance component prior to the utilization of both components to control the beam intensity of the cathode ray picture tube.

While this does indeed improve the saturation of the reproduced image it also reduces its total illumination, particularly when only one of the primary colors is being reproduced. In the aforementioned copending application it is therefore further proposed to restore the image illumination to normal, for primary color reproduction, by increasing the amplitude of the alternating signal component, prior to its application to the picture tube. It will be apparent that this latter measure also contributes to the saturation of the reproduced image since differences between the intensities of different primary color components, as represented by excursions of opposite polarities of this alternating component, will be accentuated when its amplitude is increased.

I have now found that the signal modifying system of the aforementioned copending application is capable of providing substantially complete saturation correction for scenes, or portions of scenes, whose coloration it is desired to reproduce with a high degree of saturation. However, if this system is adjusted to yield complete compensation of desaturation for scenes which should be highly saturated then it will produce oversaturation of scenes which should be less highly saturated. For example, the scenes which are potentially most highly saturated are those which are predominantly in a single primary color. For such scenes the prior art signal modification affords complete correction. On the other hand, the scenes which are potentially least saturated are those which are predominantly of a pastel color (i.e. which contain more nearly equal proportions of all three primary colors). Scenes with the latter color content tend to become oversaturated. Since flesh tones, for example, are usually pastels, this tends to make the reproduction of images of human beings less satisfactory.

It is, accordingly, a primary object of the invention to provide means, in a color television system, for improving the fidelity of color reproduction of a televised scene.

It is another object of the invention to effect image reproduction improvements in a color television system wherein a televised scene is reproduced on a single cathode ray tube screen structure comprising closely spaced fluorescent elements, different ones of these elements being emissive of light of different primary colors.

It is still another object of the invention to improve the fidelity of reproduction of the color intelligence represented by a signal including a unidirectional component and an alternating component and whose total amplitude is representative of intelligence respecting three different primary colors at three time-spaced instants during each cycle of the varying component.

It is a still further object of the invention to provide means for reducing the color desaturation which occurs when a televised scene, represented by a unidirectional monochrome signal and an alternating chrominance signal, is reproduced by means of a cathode ray tube having a screen structure formed of spaced fluorescent elements emissive of light of different colors in cyclically recurrent order, where these fluorescent elements are necessarily of finite widths.

A still further object of the invention is to provide apparatus, in a color television receiver, for modifying the received standard signal, before it is applied to a cathode ray tube having a screen structure formed of spaced elements fluorescent in different colors, so that this signal will be effective to cause more faithful reproduction of all televised scenes, regardless of their color content.

To achieve the foregoing objectives, as well as others which will appear, a color television receiver which embodies my invention is provided with a circuit for increasing the amplitude of the chrominance signal selectively relative to that of the luminance signal, to an extent which varies depending upon the initial relationship between the amplitudes of these component signals. In particular, means are provided for producing a greater increase in chrominance signal amplitude relative to luminance signal amplitude when the initial amplitude of the chrominance signal, relative to that of the luminance signal is high than when this initial relative amplitude is low.

In this manner the chrominance amplitude will be increased most, relative to the luminance amplitude, when a composite signal representative of saturated colors is being received, and least when a composite signal representative of desaturated colors is being received.

The particular relationship which should be provided between the initial relative amplitudes of the luminance and chrominance signals, on the one hand, and the degree of relative amplification to which the chrominance signal is subjected, on the other hand, depends upon a wide variety of factors, including notably the particular distribution of the screen phosphor strips and their individual dimensions and the particular timing of the different color representative portions of the composite video signal. In view of the wide variations which are possible in the aforementioned parameters, the best relationship is preferably determined experimentally by actual observation of a reproduced image.

However, I have found that consistently good results can be obtained, over a wide range of variations of the aforementioned parameters, if the amplitude of the chrominance signal is increased, relative to the amplitude of the luminance signal, by an amount which is directly proportional to the ratio of initial chrominance signal amplitude to initial luminance signal amplitude. Good results can also be obtained if the aforementioned increase in relative chrominance signal amplitude is carried out in proportion to the difference between the initial amplitudes of the two signals involved. The reason why either the ratio or the difference between the initial amplitudes may be used as a measure of the proper amount of relative amplification is that, over the range of signal variations which is of greatest importance, these two quantities vary in a similar manner.

In the foregoing discussion it has been emphasized that my invention provides for the increase of chrominance signal amplitude "relative" to luminance signal amplitude. It will be apparent that such a relative increase can be achieved either by increasing the amplitude of the chrominance signal, while holding the amplitude of the luminance signal constant, or by decreasing the amplitude of the luminance signal, while holding the amplitude of the chrominance signal fixed, or even by modifying the amplitudes of both signals simultaneously but in opposite senses. The factors governing the selection of the specific apparatus and the particular manner in which such apparatus may be constructed according to the invention is explained hereinafter with reference to the accompanying drawings wherein:

Figure 1:
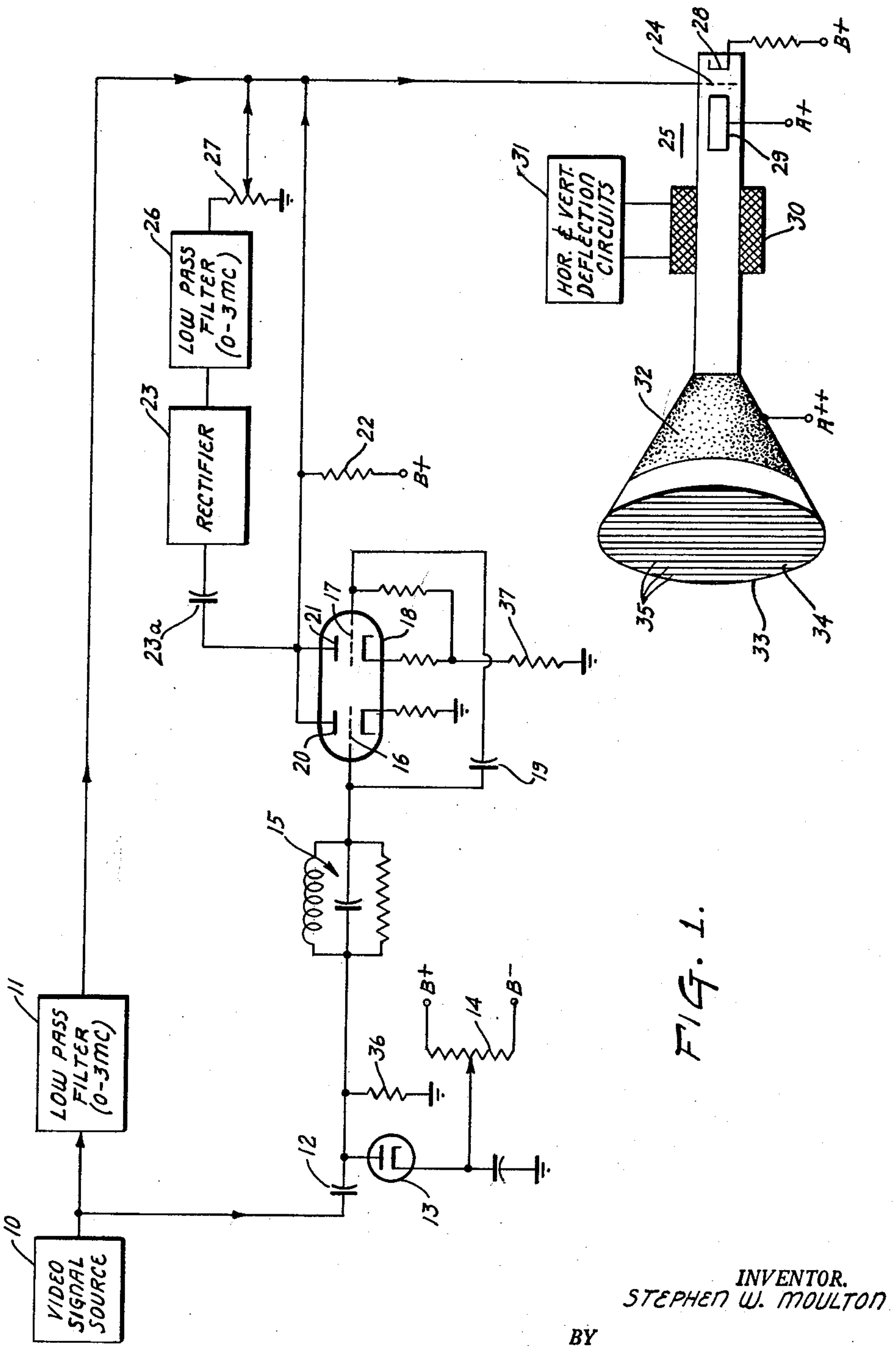
FIGURE 1 illustrates that portion of a color television receiver which embodies one form of my invention, this form being characterized by the fact that the relative signal amplitudes are modified by means of apparatus which operates on the chrominance signal.

The receiver system illustrated in FIGURE 1, to which more particular reference may now be had, derives its input signal from a video signal source 10. This video signal source 10 may comprise all of the conventional circuits of a color television receiver which precede its video frequency stages. These components may include an antenna circuit, a radio frequency amplifier, a frequency converter, an intermediate frequency amplifier and a video detector. Since these components are all entirely conventional they are not separately illustrated. In addition the video signal source 10 may include suitable circuits for modifying the rate of occurrence of color intelligence representative portions of the received video signal. These latter circuits must be provided whenever the occurrence of these intelligence representative portions of the signal is not inherently synchronized with the impingement of the image forming electron beam of the cathode ray tube (to which this signal is eventually applied) upon phosphor screen elements which are emissive of light of the corresponding colors. Circuits for modifying this rate of occurrence are known, and forms thereof which are suitable for the present purpose are described and illustrated, for example in the U.S. patent application of Robert C. Moore, Serial No. 214,995, filed March 10, 1951, issued May 6, 1958, as Patent No. 2,833,852 and in my own copending patent application Serial No. 846,532, filed October 9, 1959, now Patent No. 2,964,426, granted January 24, 1961, as a continuation of my application Serial No. 290,775, filed May 29, 1952, and abandoned November 12, 1959, which are assigned to the assignee of the present invention. Such circuits form no part of the present invention since they do not eliminate the problems arising from the disparity between the durations of the time intervals during which the composite signal is representative of any particular color and the durations of the time intervals during which the beam dwells upon a screen element emissive of light of that color. Suffice it to say, therefore, that there will be available at the output of video signal source 10, the received composite television signal reduced to its lowest, or video frequency range and modified, if necessary, in the aforementioned respects.

As hereinbefore discussed, this signal may comprise a unidirectional luminance component occupying the 0 to 3 megacycle frequency range and an alternating chrominance component at a nominal frequency of 3.58 megacycles and amplitude and phase modulated in accordance with chrominance intelligence. In addition there are conventional horizontal, vertical and color synchronizing signals interspersed at the usual intervals. The video signal from source 10 is simultaneously supplied to a low pass filter 11, which is conventionally constructed and arranged to transmit only components in the 0 to 3 megacycle frequency range (i.e. the luminance components in the illustrative case under consideration) and also to a capacitor 12 which blocks the D.-C. component of the signal from source 10. This D.-C. component is reestablished by means of diode 13 at a level established by the setting of bias potentiometer 14. The alternating signal transferred by capacitor 12, which includes the received chrominance component, is developed across parallel resonant circuit 15 and is then supplied to the grids 16 and 17 of the two sections of double triode vacuum tube 18. Connection to grid 16 is direct, while connection to grid 17 is made through a second D.-C. blocking capacitor 19. The anodes 20 and 21 of the two triode sections are both connected to a load resistor 22 which also serves as the connection to a conventional source B+ of anode potential for tube 18. The junction of anodes 20 and 21 is further connected to a rectifier 23 through a D.-C. blocking capacitor 23a and to the beam intensity grid control electrode 24 of a cathode ray tube 25. The output from rectifier 23 is supplied to a low pass filter 26, and thence, through potentiometer 27, also to the cathode ray tube grid 24. Finally the output from low pass filter 11 is also supplied to this grid 24.

The cathode ray tube 25, whose beam intensity is under the control of grid 24, may comprise a conventional cathode 28, a first anode 29 connected to a suitable source of first anode potential A+ and horizontal and vertical magnetic deflection coils 30 supplied from conventional horizontal and vertical deflection circuits 31 with such signals as are appropriate to cause the electron beam from cathode 28 to scan a conventional rectangular raster on the screen of the tube. The tube may further comprise a second anode 32 which may take the usual form of a coating of conductive material located on the inside of the funnel-shaped portion of tube 25, this coating being connected to a suitable source of second anode potential A++. On the face plate 33 of the tube there is deposited a screen structure 34. This screen structure differs most conspicuously from that of conventional cathode ray tubes used for black-and-white television in that it is not formed of a uniform layer of phosphor material but is, instead, constituted of a large number of narrow, parallel strips of phosphor materials having their longitudinal axes disposed transverse to the horizontal beam scanning direction and constructed of such materials that different ones of these phosphor strips are responsive to electron beam impingement to emit light of different primary colors, for example, red, green and blue, respectively. Phosphor strips emissive of light of these different colors are usually disposed in regularly recurrent sequence across the screen structure; in one conventional arrangement, they occur in the order red, green, blue, following the direction of horizontal scan of the electron beam. This screen construction is diagrammatically represented, in FIGURE 1, by a plurality of vertical lines 35 on the face plate 33 of the cathode ray tube.

The operation of the aforedescribed system is as follows. The luminance component supplied by signal source 10 is applied directly to the cathode ray tube 25 through the separate channel defined by low pass filter 11. However, as will be discussed hereinafter, this luminance component is not the only signal in its frequency range which is applied to this tube.

The alternating components of the signal from source 10, including notably the chrominance signal and the alternating components of the conventional deflection synchronizing pulses, are transferred by capacitor 12 and are applied to diode 13. This diode is responsive to the positive excursions of the alternating signals passed by capacitor 12 and cooperates with potentiometer 14 and bias resistor 36, to develop, in response to the excursions a corresponding negative bias potential across the bias resistor 36. Thus the D.-C. component of the received video signal, which varies in proportion to the luminance of the televised scene, is effectively restored. Moreover any desired ratio can now be established between the magnitude of the bias potential thus developed and the magnitude of the received luminance component by appropriate selection of the various circuit components involved, a convenient adjustment of this ratio being afforded by potentiometer 14. The factors governing this adjustment will be discussed hereinafter. Resonant circuit 15 is constructed to be in parallel resonance at or near the nominal frequency of the received chrominance signal (3.58 megacycles in the present instance) and serves to develop this signal for application to the grids 16 and 17. The negative bias developed by diode 13 is blocked from grid 17 by capacitor 19. The remaining parameters associated with this section of tube 18 are so proportioned that it operates as an amplifier for the chrominance signal for all amplitudes of this signal, however small. Preferably, its amplification characteristic is made substantially linear. This is achieved by the provision of cathode resistor 37, across which there is developed a degenerative feedback potential which serves to linearize the amplification characteristic in well known manner.

The grid 16, on the other hand, is supplied with the chrominance signal and also with the negative bias from diode 13. This negative bias tends to cut off that section of tube 18 which is under the control of grid 16. Preferably the parameters associated with this tube section are so proportioned that it will not conduct until the amplitude of the chrominance signal exceeds the magnitude of the bias from diode 13.

Across the anode load resistor 22, where the sum of the output signals from the tube sections appears, there will therefore be developed an output signal which is due only to the operation of the tube section controlled by grid 17, so long as the ratio between the amplitude of the chrominance signal and the magnitude of the bias developed by diode 13 is less than unity. Since this developed bias is, in turn, related to the amplitude of the luminance signal in a ratio determined by the setting of potentiometer 14, it follows that the tube section controlled by grid 16 will remain cut off, so long as the ratio of chrominance amplitude to luminance amplitude is below a predetermined value. Under these circumstances the ratio of chrominance amplitude to luminance amplitude will be modified only to the extent of the gain of the tube section controlled by grid 17. When, however, the ratio of chrominance amplitude to luminance amplitude exceeds the aforementioned value, the tube section controlled by grid 16 will also conduct and will produce an additional output signal at chrominance signal frequency. Consequently, for ratios of initial chrominance-to-luminance amplitudes in excess of the aforementioned value, the gain of the circuit under consideration will be substantially greater than for amplitude ratios below this value. Thus the circuit serves, in accordance with the invention, to increase the ratio of chrominance to luminance more when the initial ratio between these signals exceeds a predetermined value than when this ratio is less than this value.

As has been pointed out, the potentiometer 14 of FIGURE 1 makes it possible to vary the value of the ratio between chrominance and luminance amplitudes at which increased amplification of the chrominance signal begins. Since the point at which this change in gain should occur depends upon a wide variety of factors, including, for example, the precise composition of the chrominance signal, the width, spacing and light efficiency of the individual screen phosphor strips and even considerations of subjective viewer preference, no specific directions for making the aforementioned adjustment can be given. In any practical case, however, visual appraisal of the reproduced image will readily lead to the best adjustment of potentiometer 14.

The image which is produced on the screen structure of tube 25 when its grid 24 is supplied with the chrominance signal modified in the aforedescribed manner and with the luminance signal from filter 11 has considerably improved saturation characteristics for all kinds of color content despite the finite widths of the phosphor stripes and of the electron beam. However, an additional improvement in the saturation characteristics of this image can be achieved by also modifying the received luminance signal. This is accomplished by means of rectifier 23, which serves to produce a unidirectional signal of magnitude proportional to the amplitude of the chrominance signal, after the latter has been modified by passage through tube 18. This rectifier may take any conventional form; for example, it may be a simple diode rectifier. It is preferably constructed in such a manner that the unidirectional potential which it produces has a polarity opposite to that of the unidirectional luminance signal from low pass filter 11. The unidirectional potential from rectifier 23 is then supplied to filter 26, which is conventionally constructed and arranged to transfer only signals in the frequency range of the luminance signal, i.e. 0 to 3 megacycles in the case under consideration. The output from this filter is then supplied, by way of potentiometer 27 which serves to control its amplitude, to the grid 24 of cathode ray tube 25, together with the luminance signal from filter 11 and the modified chrominance signal. Since, as has been pointed out, the signal from filter 26 has a polarity opposite to that of the luminance signal it will, in effect, reduce the amplitude with which the latter reaches the grid 24. Thus the luminance signal will be applied to the cathode ray tube with an amplitude which is reduced by an amount proportional to the amplitude of the modified chrominance signal. Again the specific relationship, controlled by the setting of potentiometer 27, between the amplitude of the modified chrominance signal and that fraction thereof which is used to reduce the amplitude of the luminance signal can be determined best by actual visual observation of the cathode ray tube in operation.

Figure 2:
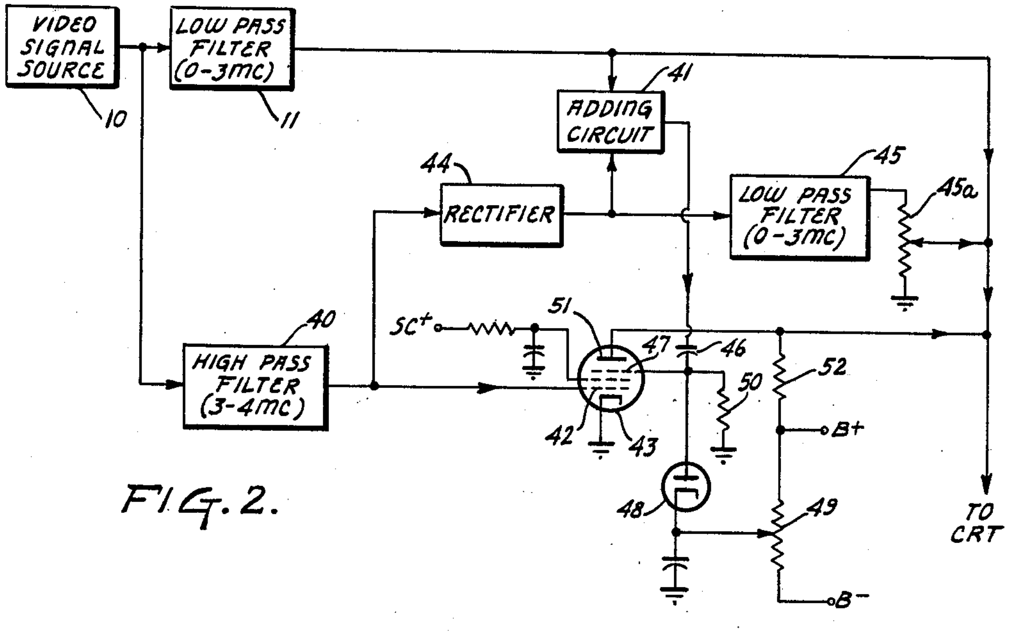
FIGURE 2 illustrates another embodiment of my invention, also characterized by operation upon the chrominance signal, but according to a different relationship.

It will be noted that, in the circuit illustrated in FIGURE 1, there are provided two separate amplifiers (respectively constituted by the different sections of tube 18) both of which operate at chrominance frequencies. Since it is clearly desirable to keep to a minimum the number of amplifiers operating at the relatively high frequencies (3.58 mc./sec.) of the chrominance component, another form of variable gain circuit has been devised which requires only a single amplifier for the chrominance signal. This modified version of the circuit is illustrated in FIGURE 2 to which more particular reference may now be had.

This circuit is supplied with a conventional color television signal at video frequencies from a source 10 of such a signal which may be similar, in all respects, to the signal source which bears the same reference numeral in FIGURE 1. As in FIG. 1, the output signal from this source is supplied to a low pass filter 11 which is constructed in conventional manner to transmit only signals in the luminance component frequency range, i.e. in the 0 to 3 megacycle range. In addition the output signal from source 10 is also supplied to a high pass filter 40 which is conventionally constructed and arranged to transmit only signals in the frequency range of the chrominance component, i.e. in the 3 to 4 megacycle frequency range. Thus there are produced, at the output terminals of filters 11 and 40, respectively, the luminance and chrominance components of the received color television signal in separate channels. The output from low pass filter 11 is supplied simultaneously to a cathode ray tube and to one input of an adding circuit 41. Since the cathode ray tube may be similar, in all respects, to cathode ray tube 25 of FIGURE 1, it has not been reproduced in FIGURE 2. The output from high pass filter 40, on the other hand, is supplied simultaneously to the control grid electrode 42 of a pentode amplifier tube 43 and to a rectifier 44. The output from rectifier 44 is supplied in turn to a second input circuit of subtracting circuit 41 and also to a low pass filter 45. The output from low pass filter 45 is then supplied to potentiometer **45*a* and thence to the cathode ray tube, together with the output from low pass filter 11. The output from subtracting circuit 41 is supplied, by way of a blocking capacitor 46, to the suppressor grid 47 of pentode 43. Also connected to this suppressor grid is a D.-C. restorer circuit which includes diode 48, potentiometer 49 and bias resistor 50. The anode 51 of pentode 43 is connected to a conventional source of B+ potential by way of anode load resistor 52** and also to the aforementioned cathode ray tube.

The operation of this circuit is as follows. The luminance signal supplied from video signal source 10 is transmitted by low pass filter 11 and applied to the cathode ray tube subject to a reduction in amplitude in proportion to the amplitude of the modified chrominance signal, as in the system of FIGURE 1. This amplitude reduction is produced by a circuit which includes rectifier 44. As has already been noted, this rectifier is supplied with the chrominance signal from the output of high pass filter 40 and serves to produce a unidirectional potential substantially equal to the peak amplitude of this chrominance signal. The rectifier may take any conventional form such as, for example, that of a simple diode rectifier. Its output, as has also been indicated, is supplied to low pass filter 45 which is conventionally constructed and arranged to transmit only signals in the luminance frequency range of 0 to 3 megacycles. Rectifier 44 is constructed so as to produce its unidirectional output potential with a polarity opposite to that of the luminance signal supplied from low pass filter 11. Consequently the signal transmitted by low pass filter 45 will also have this opposite polarity. A fraction of this signal, whose exact value is determined by the adjustment of the potentiometer **45*a*, is then supplied to the cathode ray tube, together with the luminance signal from low pass filter 11 and effectively reduces the amplitude of the latter by an amount proportional to the amplitude of the chrominance signal. As has been pointed out, this is similar to the reduction in the amplitude of the luminance signal which is effected in the system of FIGURE 1. In the system of FIGURE 2, however, the output signal from the rectifier 44, which is provided for the foregoing purpose, is also used for a second purpose. More particularly this output signal is additively combined with the unmodified luminance signal in adding circuit 41, which may be of any conventional construction suitable for producing an output potential whose amplitude is equal to that of the chrominance signal less the amplitude of the luminance signal. This output potential will become increasingly positive as the received composite signal represents increasingly saturated colors, and will become less positive, and eventually even negative, as the received signal represents less and less saturated colors. This output potential is supplied to the suppressor grid 47 of pentode 43 by way of a D.-C. blocking capacitor 46. Its unidirectional component is restored by the D.-C. restorer circuit, whose diode 48 is driven into conduction by successive occurrences of the blanking pulse in the luminance component, thereby charging capacitor 46. This charge leaks off through bias resistor 50 during intervals between blanking pulses, thereby establishing a negative reference potential across this bias resistor. The relationship between the value of this reference potential and the magnitude of the original luminance signal can be controlled by adjustment of potentiometer 49**.

The potential developed between blanking pulses by the output from adding circuit 41 will depart from this reference value in a positive sense as the output from adding circuit becomes more positive, and in a negative sense as the output from this adding circuit becomes more negative. Departures in the former sense will produce corresponding increases in the gain of tube 43 for chrominance signals applied to its control grid 42, while departures in the latter sense will produce decreases in this gain. Thus the gain of tube 43 will become greater as the amplitude of the chrominance signal increases relative to the amplitude of the luminance signal and lesser as the inverse relative variation takes place. The chrominance signal which is thus developed, with varying degrees of amplification, across the anode load resistor 42 of tube 43 is supplied to the cathode ray tube (not shown) together with the corrected luminance signal which has been derived in the manner hereinbefore described.

It will be observed that the embodiment of FIGURE 2 not only has the aforenoted advantage of utilizing one less high frequency amplifier stage than that of FIGURE 1 but, in addition it provides a chrominance channel whose gain is continuously variable in response to changes in the difference between chrominance and luminance amplitudes. By contrast the embodiment of FIGURE 1 only provides variations between two discrete values of gain, in response to changes in the ratio of these quantities. Thus the saturation correction circuit of FIGURE 2 is more sensitive to variations in signal conditions requiring different amounts of correction and would be preferable wherever such increased sensitivity is desired.

In each of the embodiments of FIGURES 1 and 2 the desired increase in chrominance amplitude relative to luminance amplitude (dependent upon the initial relation between these amplitudes) is effected by operating on the chrominance signal. However, it is feasible to achieve the same result by operating on the luminance signal instead. One form of apparatus for accomplishing this is illustrated in FIGURE 3 of the drawings, to which more particular reference may now be had.

Figure 3:
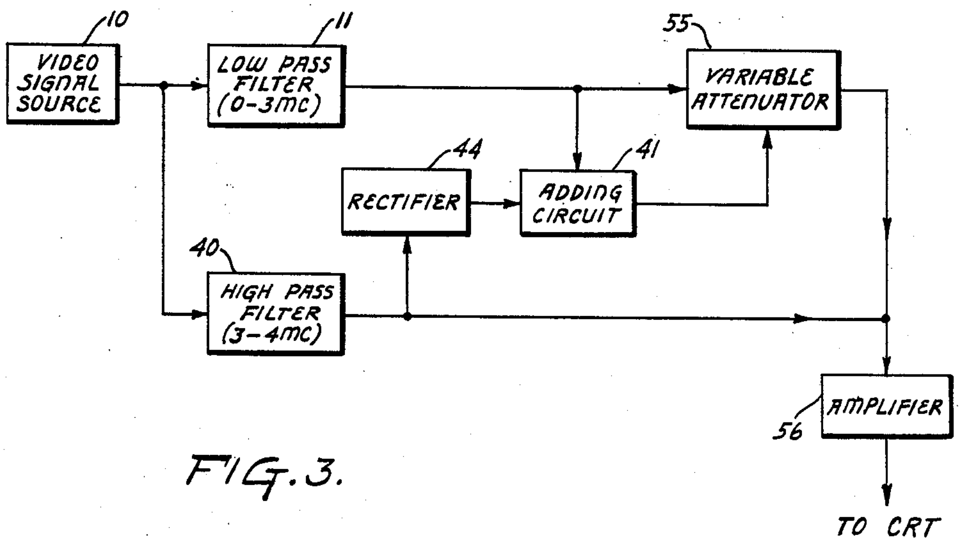
FIGURE 3 illustrates an embodiment of my invention which is characterized by the fact that the relative signal amplitudes are modified by operation upon the luminance signal.

There is shown in FIGURE 3 a video signal source 10 whose output signal is supplied to a low pass filter 11 and to a high pass filter 40 just as in the system of FIGURE 2. Consequently there are available the received luminance and chrominance signals in separate channels at the respective outputs of these filters. The luminance signal is supplied from filter 11 to one input of an adding circuit 41, which may be identical to that which bears the same reference numeral in FIGURE 2, and also to a variable attenuator 55. The output from the variable attenuator is supplied, by way of a nonlinear amplifier 56, to an image reproducing cathode ray tube (not shown) which may, for example, be similar to tube 25 of FIGURE 1. The chrominance signal from filter 40 is likewise supplied to the cathode ray tube by way of amplifier 56 and is also supplied to a rectifier 44 which may be identical to that bearing the same reference numeral in FIGURE 2. The output from rectifier 41 is further supplied to another input of adding circuit 41.

In operation the rectifier 44 serves to produce a unidirectional signal whose amplitude is substantially equal to the initial amplitude of the chrominance signal. In adding circuit 41 the luminance signal is then subtracted from this unidirectional signal to produce an output signal which is representative of the initial amplitude relationship between chrominance and luminance signals, just as is the corresponding signal in the system of FIGURE 2. This signal will be at a certain reference value when the signal amplitudes in question are equal. It will depart increasingly in a positive sense from this reference value as the composite signal represents more saturated colors (i.e. chrominance amplitude exceeds luminance amplitude), and in a negative sense as the signal represents less saturated colors (i.e. luminance amplitude exceeds chrominance amplitude). This output signal from adding circuit 41 is then used to control the variable attenuator 55 in such a manner that its attenuation for luminance signals will be a maximum when the control signal has its maximum positive value and a minimum when the control signal has its maximum negative value. This minimum value of attenuation is preferably zero, corresponding to unimpeded transmission of the luminance component. To the foregoing ends the variable attenuator 55 may take any of a number of conventional forms. For example it may consist of a vacuum tube amplifier which has a maximum gain of unity and which is responsive to the aforementioned variations in the signal from adding circuit 41 to vary its gain between unity and another value considerably smaller than unity. Clearly the aforedescribed apparatus will produce the desired modification of the relationship between chrominance and luminance amplitudes. However this is now done entirely by decreasing the amplitude of the luminance signal, and without providing any amplification for the chrominance signal. As a result the absolute amplitudes of these two signals may become smaller than desired for application to a cathode ray tube. To guard against this, both signals are subjected to additional amplification in amplifier 56, which is conventionally constructed to be substantially equally effective for both signals. Consequently this amplifier produces no further modification of the relative amplitudes of these signals.

It will be understood that various other embodiments of my inventive concept will occur to those skilled in the art. For example, it is possible, by a simple modification of the circuit of FIGURE 1, to provide different degrees of amplification for the chrominance signal depending not only upon whether a saturated or an unsaturated color is being reproduced but depending also upon whether the color is a pure primary color or a complementary color. To achieve this it suffices to derive, from the conventional color synchronizing signal which is received in the form of a burst of sine waves at the nominal chrominance frequency, a continuous signal of three times the frequency of the chrominance signal and of controllable phase. This signal may then be added to the chrominance signal which is applied to the grid 16 of tube 18 in FIGURE 1 where its positive excursions will serve to gate this tube on. By varying the phase of this triple frequency signal the tube may be gated on either in a phase corresponding to impingement of the beam upon phosphor strips or in a phase corresponding to impingement of the beam upon the intervals between phosphor strips. In the first case the beam intensity will be enhanced during the reproduction of primary colors, while in the second case the beam intensity will be enhanced during the reproduction of complementary colors.

According to another modificaiton it may be desirable to carry out the separation of the luminance signal from the chrominance signal at a stage prior to that at which this separation is carried out in the embodiments illustrated. This alternative arrangement is usually desirable when it is necessary to match the occurrence of intelligence representative intervals in the chrominance signal component to the intervals of impingement of the electron beam upon particular phosphor elements of the screen structure in the manner described in the aforementioned patent to R. C. Moore and in my own copending application aforementioned. This is because the transformations required for such matching are performed separately on the chrominance and luminance signals so that they must be provided in separate channels for that purpose.

In view of these and still other possible modifications I desire the scope of my inventive concept to be limited only by the appended claims.

I claim:

1. In combination: means for producing a unidirectional signal; means for producing an alternating signal whose amplitude is subject to variations relative to the amplitude of said unidirectional signal; signal transfer means supplied with both said signals, said last-named means being responsive to a control signal of given characteristic to provide a gain for said alternating signal which bears to its gain for said unidirectional signal a ratio of at least unity and being responsive to a control signal of different characteristic to provide said respective gains in an even higher ratio; means responsive to said unidirectional and alternating signals to produce a signal of said given characteristic when the alternating signal amplitude is small relative to the unidirectional signal amplitude, and of said different characteristic when said alternating signal amplitude is high relative to said unidirectional signal amplitude; and means for applying said produced signal to said signal transfer means as said control signal.

2. In combination: means for producing a unidirectional signal; means for producing an alternating signal whose amplitude is subject to variations relative to the amplitude of said unidirectional signal; signal transfer means supplied with both said signals, said last-named means having a gain for said alternating signal which is at least as high as its gain for said unidirectional signal when the alternating signal amplitude is small relative to the unidirectional signal amplitude and having a gain for said alternating signal which increases relative to the gain for said unidirectional signal as said alternating signal amplitude increases relative to said unidirectional signal amplitude; means responsive to the alternating signal transferred by said signal transfer means to produce a control signal representative of the amplitude of said transferred signal; means responsive to said control signal to reduce the amplitude of said unidirectional signal by an amount proportional to the amplitude of said control signal; and means for supplying said unidirectional signal of reduced amplitude and said transferred alternating signal to a common signal utilization device.

3. In combination: a common source of a unidirectional signal and of an alternating signal whose amplitudes are subject to relative variations; a pair of separate signal channels; means for directing said unidirectional signal into one of said channels and said alternating signal into the other of said channels; variable gain signal transfer means connected in said alternating signal channel, said transfer means being responsive to a control signal of a first value to transfer said alternating signal with a gain which is at least as high as the gain of said unidirectional signal channel and said transfer means being responsive to a control signal of a second value to transfer said alternating signal with even higher gain; means supplied with both said unidirectional and alternating signals from said source and responsive thereto to produce a signal of said first value when the amplitude of said alternating signal is small relative to the amplitude of said unidirectional signal and to produce a signal of said second value when the amplitude of said alternating signal is large relative to the amplitude of said unidirectional signal; and means for supplying said produced signals to said variable gain signal transfer means as control signals.

4. In combination: a common source of a unidirectional signal and of an alternating signal whose amplitudes are subject to relative variations; a pair of separate signal channels; means for directing said unidirectional signal into one of said channels and said alternating signal into the other of said channels; variable gain signal transfer means connected in said unidirectional signal channel, said transfer means being responsive to a control signal of a first value to transfer said unidirectional signal with a gain which is at least as low as the gain of said alternating signal channel and said transfer means being responsive to a control signal of a second value to transfer said unidirectional signal with even lower gain; means supplied with both said unidirectional and alternating signals from said source and responsive thereto to produce a signal of said first value when the amplitude of said alternating signal is small relative to the amplitude of said unidirectional signal and to produce a signal of said second value when the amplitude of said alternating signal is large relative to the amplitude of said unidirectional signal; and means for supplying said produced signals to said variable gain signal transfer means as control signals.

5. In combination: means for producing a unidirectional signal; means for producing an alternating signal whose amplitude is subject to variations relative to the amplitude of said unidirectional signal; signal transfer means supplied with both said signals, said last-named means being responsive to a control signal of given characteristic to provide a gain for said alternating signal which is at least as high as the gain for said unidirectional signal and being responsive to a control signal of different characteristic to provide even higher gain for said alternating signal; means supplied with said unidirectional and alternating signals and responsive thereto to produce a signal of said given characteristic when the ratio of the amplitude of said alternating signal to the amplitude of said unidirectional signal is below a predetermined value, and of said different characteristic when said ratio exceeds said predetermined value, said last-named means comprising means responsive to said supplied signals to produce an output signal which is a function of the amplitudes of said alternating signal and said unidirectional signal; and means for applying said produced signal to said signal transfer means as said control signal.

6. In combination: means for producing a unidirectional signal; means for producing an alternating signal whose amplitude is subject to variations relative to the amplitude of said unidirectional signal; signal transfer means supplied with both said signals, said last-named means being responsive to a control signal of given characteristic to provide a gain for said alternating signal which is at least as high as the gain for said unidirectional signal and being responsive to a control signal of different characteristic to provide even higher gain for said alternating signal; means supplied with said unidirectional and alternating signals and responsive thereto to produce a signal of said given characteristic when the amplitude of said alternating signal is low relative to that of said unidirectional signal and of said different characteristic when the amplitude of said alternating signal is high relative to that of said unidirectional signal, said last-named means comprising means responsive to said supplied signals to produce an output signal proportional to the amplitude of said alternating signal less the amplitude of said unidirectional signal; and means for applying said produced signal to said signal transfer means as said control signal.

7. In combination: means for producing a unidirectional signal; means for producing an alternating signal whose amplitude is subject to variations relative to the amplitude of said unidirectional signal; a first signal channel supplied only with said unidirectional signal and having predetermined gain for said signal; a second signal channel supplied with said unidirectional signal and with said alternating signal, said second channel comprising a pair of vacuum tubes, each having at least an anode, a cathode and a control grid electrode, means for supplying said alternating signal between said cathode and both said control grid electrodes, means for supplying a signal proportional to said unidirectional signal between said cathode and one of said control grid electrodes with such polarity as to reduce the conductivity of the vacuum tube which is subject to control by said last-named electrode, and means connecting both said anodes to a common load circuit whereby there is developed across said load circuit a signal proportional to the sum of the alternating signals produced at said anodes.

8. In combination: means for producing a unidirectional signal; means for producing an alternating signal whose amplitude is subject to variations relative to the amplitude of said unidirectional signal; a first signal channel supplied only with said unidirectional signal and having predetermined gain for said unidirectional signal; a second signal channel supplied only with said alternating signal, said second signal channel comprising a vacuum tube having at least an anode, a cathode and first and second control grid electrodes, and means for supplying said alternating signal between said cathode and said first control grid electrode; means supplied with both said unidirectional and alternating signals and responsive thereto to produce a control signal whose magnitude is proportional to the difference between the amplitudes of said alternating and unidirectional signals; and means for supplying said control signal between said cathode and the other grid of said vacuum tube so as to increase the gain of said tube for signals supplied between said cathode and said first control grid electrode in response to variations in said control signal which are indicative of increases in said amplitude difference.

9. In a color television receiver, means for producing a luminance representative signal and a chrominance representative signal; signal transfer means supplied with both said signals and responsive to a control signal of given characteristic to provide a gain for said chrominance signal which bears to its gain for said luminance signal a ratio of at least unity and responsive to a control signal of different characteristic to provide said respective gains in an even higher ratio; means responsive to said luminance and chrominance signals to produce a signal of said given characteristic when the amplitude of said chrominance signal is low relative to that of said luminance signal and of said different characteristic when the amplitude of said chrominance signal is high relative to that of said luminance signal; means for applying said produced signal to said signal transfer means as said control signal; a color image reproducing device; and means for supplying the output of said signal transfer means to said reproducing device.

10. In a color television receiver: means for producing a luminance representative signal; means for producing a chrominance representative signal whose amplitude is subject to variations relative to the amplitude of said luminance representative signal; variable gain signal transfer means supplied with both said signals and responsive to a control signal to transfer said chrominance representative signal with a gain which is at least as high as the gain of said transfer means for said luminance representative signal when said control signal has a first value and responsive to said control signal to transfer said chrominance representative signal with even higher gain when said control signal has a second value; means supplied with both said luminance representative and chrominance representative signals and responsive thereto to produce a signal which has said first value when the amplitude of said chrominance representative signal is low relative to that of said luminance representative signal and which has said second value when the amplitude of said chrominance representative signal is high relative to that of said luminance representative signal; and means for applying said produced signal to said signal transfer means as said control signal.

11. In a color television receiver: means for producing, in separate channels, a luminance representative signal and a chrominance representative signal whose amplitudes are subject to relative variations; variable gain signal transfer means connected in at least one of said channels, said transfer means being responsive to a control signal to transfer said chrominance representative signal with a gain which is at least as high as the gain of said transfer means for said luminance representative signal when said control signal lies within a first range of values, and said transfer means being responsive to said control signal to transfer said chrominance representative signal with even higher gain when said control signal lies within a second range of values; means supplied with both said luminance representative and chrominance representative signals and responsive thereto to produce a signal lying within said first range of values when the amplitude of said chrominance representative signal is small relative to the amplitude of said luminance representative signal and to produce a signal lying within said second range of values when the amplitude of said chrominance representative signal is large relative to the amplitude of said luminance representative signal; and means for applying said produced signals to said signal transfer means as control signals.

12. In a color television receiver for a color television signal which includes brightness components and a modulated chroma subcarrier component, circuit means for receiving and detecting said color television signal, a color image reproducing device, a brightness channel coupled to said circuit means for translating said brightness components to the reproducing device, and a channel separate from said brightness channel for translating the chroma subcarrier component from said circuit means to said reproducing device, said last-named channel comprising amplifying means and means for controlling said amplifying means so that portions of said chroma subcarrier representing more saturated colors are amplified to a greater extent than portions representing less saturated colors.

13. In a color television receiver for a color television signal which includes a brightness component and a modulated chroma subcarrier component, circuit means for receiving and detecting said color television signal, a color image reproducing device, and channelling means for translating said chroma subcarrier component from said circuit means to said reproducing device, said channelling means comprising amplifying means and means for controlling said amplifying means so that portions of said chroma subcarrier representing more saturated colors are amplified to a greater extent than portions representing less saturated colors.

14. In a color television receiver for utilizing a color television signal which includes brightness components and which further includes a modulated chroma subcarrier component the amplitude of which represents color saturation, said receiver including circuit means for receiving and detecting the color television signal, a color image reproducing device, and a brightness channel coupled to said circuit means for translating the brightness components of the color television signal to the reproducing device; the combination of a bandpass filter coupled to said circuit means for selecting the modulated chroma subcarrier, an amplifier coupled to said filter for amplifying the modulated chroma subcarrier, means for controlling said amplifier so that portions of the chroma subcarrier representing more saturated colors are amplified to a greater extent than portions representing less saturated colors, and means coupled to said amplifier for supplying the resulting color information to the color image reproducing device with more saturated colors represented thereby accentuated with respect to less saturated colors.

15. In combination: a first circuit to provide a signal representative of color information with respect to a color image, said signal having characteristics which are representative of the level of color saturation of said color image, a signal processing circuit operatively connected to said first circuit to receive said signal, and means for modifying the operation of said signal processing circuit when said level of color saturation falls below a predetermined level.

References Cited in the file of this patent

UNITED STATES PATENTS 3,002,049 Loughlin ---------------- Sept. 26, 1961